Feb. 29, 1972    A. O. GALLA    3,646,181
METHOD OF CONSTRUCTING AN ORNAMENTAL PLASTER SURFACE
UTILIZING A FLEXIBLE WOVEN GLASS STRIP
AS AN INTERMEDIATE SUBSTRATE
Filed June 2, 1969
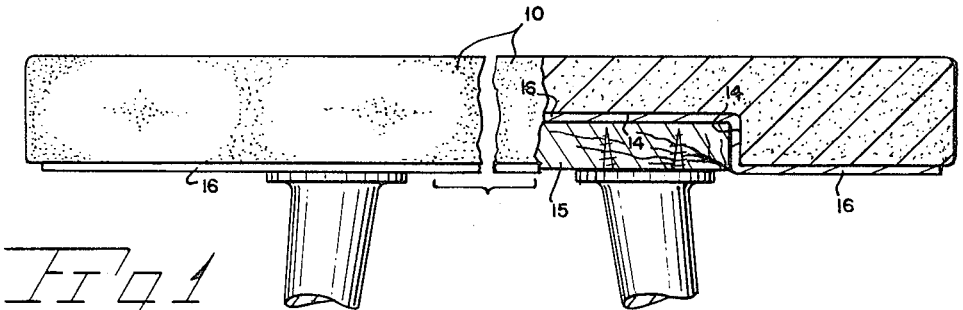
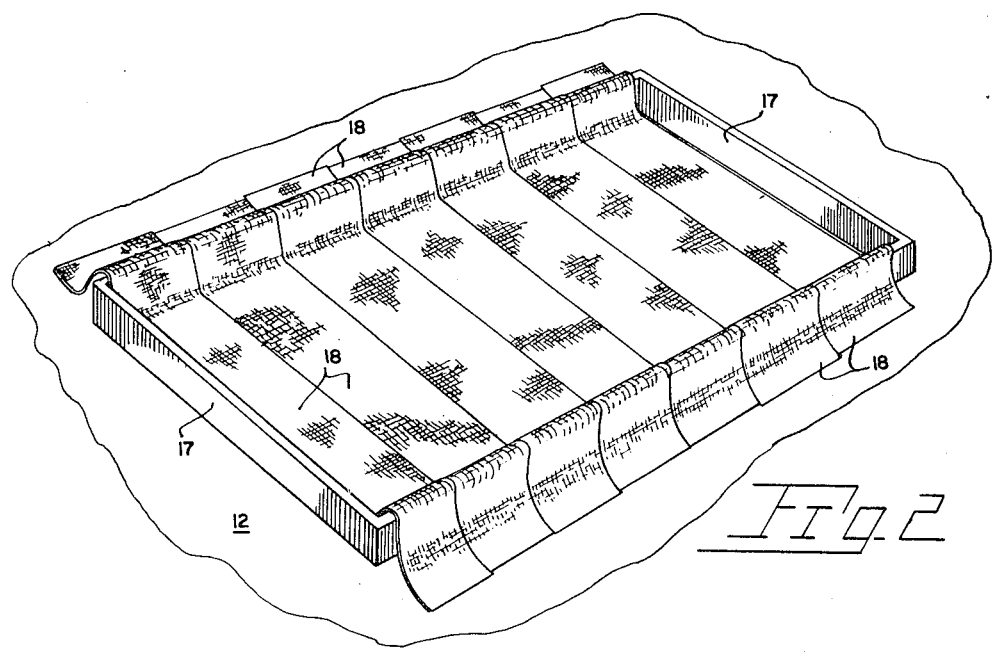
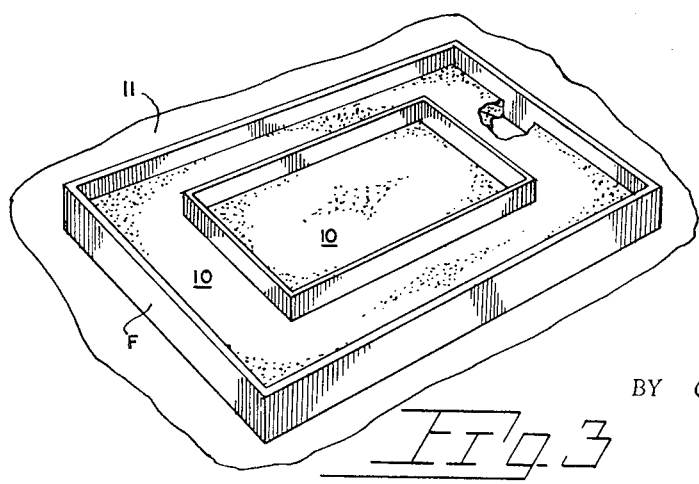
ALFRED O. GALLA
*INVENTOR.*
BY *James K. Giving Jr.*
AGENT United States Patent Office 3,646,181
Patented Feb. 29, 1972

3,646,181
METHOD OF CONSTRUCTING AN ORNAMENTAL PLASTER SURFACE UTILIZING A FLEXIBLE WOVEN GLASS STRIP AS AN INTERMEDIATE SUBSTRATE
Alfred O. Galla, P.O. Box 830, Wrangell, Alaska
Filed June 2, 1969, Ser. No. 829,458
Int. Cl. B29c 21/00
U.S. Cl. 264—73                                          1 Claim

ABSTRACT OF THE DISCLOSURE

A method of constructing an ornamental plaster surface utilizing flexible strips of woven glass as an intermediate substrate. A mold is covered with flexible woven glass fiber strips and a viscous mixture of Keene's cement and pigment is poured onto the strips. The strips with the mixture adhering thereto are sequentially removed from the mold and applied to a horizontal, vertical or curved surface. The strip is peeled away from the applied viscous mixture and the exterior surface areas are smoothed to remove irregularities.

BACKGROUND OF THE INVENTION

The present invention relates to a decorative article of manufacture for use as a table or counter top, a wall surface and the method of manufacturing same. More particularly the invention resides in the construction of a decorative material largely constituted of Keene's cement, a type of plaster material.

The prior art known does not provide a product wherein the finished surface is both impervious and is of a material lending itself to artistic expression by the careful addition and partial mixing of coloring agents with the plaster material while the latter is in a semi-liquid state. The material when in its finished form presents an attractive appearance with a great variety of designs being possible.

SUMMARY

The present invention comprehends the combination of Keene's cement with a plurality of coloring agents partially intermixed with the cement material to provide an attractive surface covering useable as a table top, wall coverings and the like. The manner in which the selected coloring agents are incorporated into the viscous Keene's cement mixture may be varied to achieve the particular effect desired. Hence it will be seen that the steps of adding coloring agents and inter-mixing thereof with the cement material are to be done on a pre-determined basis to achieve the desired effect and the latter not being simply a matter of chance. Additionally, the invention includes the methods of application of viscous, colored Keene's cement (plaster) material to an upright surface which may be of curved shape with the material being transferred to the surface in sections from a mixing location.

DESCRIPTION OF THE DRAWINGS

In the accompanying drawing:
FIG. 1 is a side elevational view of a sectional table top in accordance with the present invention with a fragment broken away to show internal structure, and
FIG. 2 is a perspective view of a form with a series of strips in place preparatory to deposit of a quantity of viscous plaster,
FIG. 3 is a perspective view of a partially filled form.

DESCRIPTION OF PREFERRED EMBODIMENTS

The article and method embodying the present invention have a base of plaster material more specifically known in the art as Keene's cement which is defined generally as a quick setting, hard plaster made by soaking plaster of paris in a solution of alum or borax and cream of tartar. The plaster product is now commercially sold under a number of trademarks as Keene's cement. For the sake of continuity the Keene's cement will also hereinafter be termed plaster material.

The method of manufacture comprises the steps of mixing the plaster, sold in powder form, with water in the prescribed ratio i.e., for every pound of the powdered plaster add one-half pint of water. The resulting viscous plaster material is then thoroughly mixed.

Separately mixed are the colors to be added to the mixed plaster material. These colors are preferably of the type presently manufactured and sold for the purpose of coloring wall plaster mixtures and, of course, used in that regard as a solitary coloring agent. Such colors are pre-mixed in water prior to addition to the viscous plaster. A typical proportion of each coloring material would be three liquid tablespoons to each twenty-five pounds of Keene's cement. The separately mixed colors hence are water mixed in individual containers, the number of color solutions being discretionary. Each water suspended coloring agent or solution is separately added into the previously prepared viscous plaster. The degree of mixing of the agent with the viscous plaster may range between simply being added to viscous plaster to an almost entirely mixed condition whereas the added color provides only slight variations in contrast with the plaster's own whitish color.

The second color to be added to the viscous plaster material is similarly pre-mixed to form a water based solution per conventional plaster coloring practice and then added to the plaster with the mixing being again somewhat less than complete. The resulting mass of viscous plaster material will have muted shades of the two colors, the intensity of the shades depending upon the quantity of color added and upon the extent to which each color solution is mixed with the viscous plaster. Accordingly if sharp color contrasts are desired in the finished material the color solutions will be added to the plaster with but one or two swirls of the mixing paddle.

When the colors have been added to the plaster the resulting mass is poured from the mixing vessel into a form such being of a size and shape determined by the actual use of the finished product. For example in the construction of a decorative slab as at 10 for use as a table top, a curved or straight sided closed form F is provided, the bottom of which is preferably supported by a sheet of glass 11. Glass when so used has been found to result in a very smooth surface on the finished slab however other material of a similar smooth surface may be used if desired.

The pouring step is completed upon discharge of the viscous plaster onto the glass surface with the closed form determining the configuration of the edges of the finished material. In constructing material for use as table tops, drainboards or planar sheet material for wall application, thicknesses (depths) of the poured plaster may range from one-quarter to one-half inch or more with the sheet material for walls being a convenient four feet by eight feet size. Table tops, drainboards and other such articles are formed inverted. For extraction of excess moisture an absorbent material is placed upon the leveled plaster in the mold and lightly pressed into full surface contact therewith. In a temperature range of sixty-five degrees F. to seventy degrees F. curing will take place within twenty-four to forty-eight hours at which time the form is removed, the slab inverted and the glass plate separated from the solid plaster slab of material.

A variation in the above method is the pouring of the viscous plaster in two stages. A first stage is poured as shown in FIG. 3 to approximately one-half the desired depth of the finished material thickness whereupon a frame having sides inwardly spaced from the form is temporarily set into place. Subsequent pouring of the second stage will fill in the area intermediate the form edges and the inwardly disposed frame. Upon curing, as above described, a centrally located recessed area defined in FIG. 1 by walls at 14 is provided in the underside of the finished slab within which may be inset a wooden plate 15 as later described. The plate facilitates leg attachment and further reinforces the slab material against downwardly directed loads.

With regard again to the form, if such is straight sided it is entirely feasible to provide segments of glass as liners along the interior of the side members of the form to produce a finished slab having sidewalls equal in smoothness to the surface poured on the previously described glass plate. When, for example, the side members are of wood the resulting slab will require sanding to produce a finish on its sides comparable to the aforementioned surface.

Upon curing of the plaster slab being completed the material is then ready for application to a supporting surface such as an existing counter or table top or an upright wall surface. In uses wherein the plaster slab is not fully supported by an underlying structural member e.g., as a table top, it is very desirable to apply a backing component to the slab. One such component found entirely satisfactory is woven glass fibre material of the type commonly used as a reinforcing agent for synthetic resins with such material being indicated at 16.

In instances wherein it is desirable to insert a wooden plate within a recess formed in the underside of the slab, the material 16 is applied to the entire underside including the walls 14 of the recess. Immediately after application of the resin to the material 16, the wooden insert member 15 is fitted prior to setting of the resin occurring. Accordingly the wooden member upon setting of the resin is securely bonded into place within the recess. The curing time for resin impregnated material 16 is approximately from 12 to 24 hours at sixty-five degrees F. to seventy degrees F. The finished slab is now completed and ready for the attachment of leg members or placement upon a pre-existing surface, either horizontal or vertical. It will be realized that when applied to a fully supporting surface no reinforcement will be required.

A modification of the presently described invention is hereinafter described which permits application of the viscous plaster to a curved supporting surface. The supporting surface to be covered is prepared to receive the viscous plaster by applying thereto a quarter inch or so layer of conventional wall plaster to the upright surface to be covered. This coating must be dry prior to application of the viscous plaster as later described.

A form 17 is assembled, as shown in FIG. 2, such having at least one crosswise dimension approximately one foot in length. The form again may be of a depth previously noted. Over the form are laid juxtaposed strips of material 18 preferably cheese cloth, of roughly three inch widths and extending beyond the form's sides associated with the above noted crosswise dimension. From this it will be seen that a series of material strips in edge-to-edge relationship are occupying the interior of the form with the strip ends terminating exteriorly of the form for grasping purposes.

The viscous plaster is mixed as described in connection with the first form of the invention and then poured into the form to a shallow depth of a quarter of an inch or so causing the strips of material to be pushed outwardly, downwardly and against the form and the underlying surface 12. The shallow layer of viscous plaster material is of a high viscosity to permit removal from the form in sections by grasping of the material ends outwardly of the form. The material with the quarter inch or so layer of viscous plaster thereon is manually moved to an upright position whereupon it is applied to the previously plaster coated surface. The layer of viscous plaster is now in adhering contact with the previously plastered surface and may be smoothed by the drawing of a smooth edged instrument over the outer or material covered side of the viscous material. Upon such placement of several sections of viscous material on an upright surface and upon removal of their material strips any lines of demarcation therebetween or impression left by the strip material 18 may be obliterated by a slight doctoring of the edges of the juxtaposed sections again with a smooth edged instrument.

By sequential placement of the sections of viscous plaster on the upright surface in the same relationship as existed in the form, a continuous color arrangement may be effected similar to that of a plaster slab as above noted. The depth of the viscous plaster in the form being approximately a quarter of an inch with the shallow depth and viscosity of the plaster contributing to its stability against flowing when the sections are removed. The colors of the finished work are, as earlier mentioned, muted having no sharp color contrasts thus the material so applied to the vertical surface will appear as if it had been initially cast in place thereon.

In regard to use of the material as a counter or table top it is desirable that for both protection and appearance purposes a clear plastic finish be applied such being of the type commercially sold to protect underlying surfaces. Two such finishes are marketed under the trademarks Verathane and Marvathane.

What I claim is new and desired to be secured under a Letters Patent is:

1. The method of constructing an ornamental plaster surface material for use on table tops, wall sidings and the like, said method comprising the steps of:

mixing a quantity of Keene's cement with water to form a viscous plaster material, adding a first coloring agent to the viscous quantity of Keene's cement, partially mixing said coloring agent into said viscous cement wherein the color so mixed appears in various hues, adding a second coloring agent to the quanitity of cement, partially mixing said second coloring agent into said viscous cement wherein the color so mixed appears in various hues with a portion of the cement colored by the combined coloring agents, placing a series of flexible strips crosswise in a juxtaposed manner in a wall enclosed form, pouring a layer of cement into the form with the surface of the plaster when poured characterized by various hues and composite colors of the coloring agents, removing a strip at a time in sequence from the form with a quantity of viscous cement in place thereon for application of the cement in sequence to a surface, peeling of the flexible strip away from the layer of applied viscous cement, and smoothing of the exterior surface areas of the cement to remove irregularities remaining upon removal of said strips.

References Cited
UNITED STATES PATENTS

| | | | |
|---|---|---|---|
| 125,122 | 4/1872 | Davey | 264—256 X |
| 214,348 | 4/1879 | Baker | 106—110 |
| 527,969 | 10/1894 | Montagne | 264—73 |
| 2,443,961 | 6/1948 | Pelatowski | 264—256 X |

ROBERT F. WHITE, Primary Examiner

T. P. PAVELKO, Assistant Examiner

U.S. Cl. X.R.

264—245, 256